United States Patent Office 3,295,991
Patented Jan. 3, 1967

3,295,991
ENZYMATIC PROCESS OF MAKING CHEESE AND
CHEESE PRODUCTS
Winifred M. Cort, Lloyds Neck, and Lloyd K. Riggs, Oakdale, N.Y. (both % Evans Research & Development Corp., 250 E. 43rd St., New York, N.Y. 10017)
No Drawing. Continuation of application Ser. No. 58,643, Sept. 27, 1960. This application Feb. 18, 1963, Ser. No. 259,361
5 Claims. (Cl. 99—116)

This application is a continuation of application Serial No. 58,643 filed September 27, 1960 and now abandoned.

This invention relates to a novel method of producing cheese, particularly to a process in which living microorganisms are not necessary to develop the cheese.

The modern art of cheese making has changed little from the ancient procedures. Cheese is made from milk by the following steps:

(A) Curd is formed from milk by (1) The development of lactic acid formed by bacteria and (2) by the addition of rennet; usually a combination of these two factors is employed.

(B) The curd is warmed and separated from whey.

(C) The curd is appropriately treated; pressed into various forms, salted and stored under appropriate conditions for curing i.e. for the development of curd into cheese.

Additional cultures or other organisms may or may not be added to the cheese curd. For example: the culture chiefly involved in the curing of such cheeses as Swiss and Cheddar cheese are bacterial cultures added to the milk in the cheese vat. The cultures *Oidium lactis* and *Brevibacterium linens,* involved in the curing of Limburger and some other soft ripened cheeses, are grown on the surface of the cakes of cheese. Camembert is a surface ripened cheese in which the chief microorganism is a mold. In the case of Bleu cheeses, mold spores are generally added to the cheese curd and the mold is allowed to grow aerobically for some time. Then anaerobic conditions are brought about, the growth of the mold is checked and the typical flavor and aroma of Bleu cheese develops during a curing period.

Various modifications and variations of this basic method have been developed in order to improve the texture of the finished cheese and to reduce the curing time. Available anzymes, known for their activity on casein, have been added to milk curd in order to obtain specific cheese textures and the form and size of the curd have been adjusted to give a greater surface area upon which the microorganisms can act and therefore reduce the curing time. However, there have been no substantial alterations in the fundamental processes of cheese making.

The presently used commercial procedures involve many uncontrollable conditions which produce extreme variations in the resulting cheeses. It is not possible to predetermine the quality of the cheese even though the procedure is conducted under conditions as uniform as possible e.g. controlling the quality of the milk, time temperature, salt content, etc. However, these give only an indirect element of control over the end product; other variables such as the curing procedure also affect the quality and characteristics of the finished cheese.

Cheese is prepared from various kinds of milk, depending upon the flavor and type of cheese desired, i.e. cow's milk—Bleu cheese, ewe's milk—Roquefort, etc. In the first stage, starters (cultured organisms) are added to milk in order to produce acid, which hastens coagulation and formation of curd and to produce special effects such as the eyes in Swiss cheese. The starter further assists in separation of the whey from the curd. It also influences the body, the flavor and other characteristics of the finished cheese. The most commonly used starters are *Streptococcus lactis* or *Streptococcus cremoris* or both. They convert some of the lactose of the milk into lactic acid. A seed starter or culture is used to inoculate either whole milk or skim milk, usually previously pasteurized, which in turn is used as cheese starter and is added to the milk in the cheese vat. The milk to which the latter starter is added may be fresh milk or skim milk. The milk is usually pasteurized and then cooled to about 72° F. before inoculating with the starter.

The next step is the coagulation of the milk, usually accomplished by rennet extract or the acid developed by the starter, or both. The firmness of the curd is controlled by regulating the amount of rennet extract, the temperature, the time and the acidity.

The whey is removed from the curd to an appropriate degree in order to have a product which can be pressed into desired form. Several mechanical factors assist in the removal: cutting the curd, heating the curd and separation of the curd from the whey. The curd may or may not be salted.

The second stage is the ripening. During ripening microorganisms act on the curd under suitable conditions of temperature and humidity to produce the flavor and physical characteristics of the finished cheese. In some varieties, the curd-making operations are brief while the ripening operations may continue for many months or even years. Other varieties, such as cottage cheese, cream cheese and Neufchatel require no ripening before they are ready to eat.

One of the most important factors in cheese is the fat content of the milk. Cheese is made from skimmed milk (cottage cheese), partly skimmed milk (Swiss cheese), milk to which cream has been added (cream cheese) and whole milk (Cheddar cheese).

The environment of a ripening cheese is important. The preliminary procedures were chosen to encourage specific ripening changes by the microorganisms in or on the curd, which are activated under specific curing environment. For example, mold ripening cheese, i.e. Bleu cheese, Camembert, etc., generally require a cool, wet environment; surface ripening cheeses, i.e. Munster, Limberger, etc., do best in a moderately cool, wet room; Cheddar requires a cool temperature and will endure low humidity; Swiss cures in a warm, wet room for eye formation and then follows the Cheddar requirement for final ripening.

Cheeses in general are categorized as:

Hard—e.g. Cheddar, Swiss, Provolone, Parmesan, etc.
Soft ripening—e.g. Limburger, Oaka, Bell Paese, etc.
Mold developed:
    (A) Center ripening—Bleu cheeses
    (B) Surface ripening—Camembert Each is developed by the action of microorganisms upon the curd, permitting growth of the organisms and then allowing the curing to proceed for some time under anaerobic conditions.

In some cases, e.g., the surface ripening cheese, the curd is packed into a form and the microorganisms are grown on the outer surface of the curd. The curd is then wrapped to exclude air and is permitted to cure for varying periods of time. The center ripening cheeses are of several types. In the hard cheeses, such as Cheddar and Swiss, the organisms involved are added with the starter, the curd is packed into hoops, pressed and allowed to develop characteristic body and flavor anaerobically. In the center ripening mold produced cheeses, such as Bleu cheese, the curd is mixed with mold spores, permitted to grow aerobically; and then eventually sealed to permit the production of flavor.

In general, the presently used, commercial, cheese producing methods provide little or no control over the quality of the resultant cheese, they involve lengthy curing periods and they require involved procedures and multiple steps in the production of cured cheeses.

An object of our invention is to overcome many of the disadvantages of the present cheese producing methods.

Another object of our invention is to provide a novel method of producing cheese in a relatively short period of time.

Still another object is to provide a novel method for producing a cheese of high uniformity.

Still another object is to provide a novel method of making cheeses that is simple, direct, easily controlled and relatively free from the uncertainties encountered in the present production methods.

A further object is to provide a novel method of producing cheese of improved characteristics.

Another object of our invention is to provide a novel method of producing food products having unique cheese flavor characteristics.

A still further object of our invention is to provide cheese products having improved characteristics.

Yet a further object of our invention is to provide novel products having unique cheese flavor characteristics.

Another object of our invention is to provide novel cheese products having the attributes set forth in the foregoing objects.

Objects and advantages of the invention have been set forth in part and in part will be obvious herefrom or may be learned by practice with the invention, the same being realized and attained by means of the steps, combinations and improvements pointed out in the appended claims.

We have discovered that the objects of our invention may be realized by producing cheese and cheese flavored products by the direct addition of suitable enzymes to milk or milk curd.

The suitable enzymes, hereinafter described in detail, catalyze chemical reactions in the milk, which reactions produced the desired effect, e.g. curd formation, cheese flavor, etc. Appropriate enzyme preparations, when added to milk, catalyze the formation of lactic acid, and assist in the production of curd or when added to curd, catalyze the reaction which produces the curing of curd which in turn develops the characteristics of the cheese, such as the desired texture, bouquet, flavor, etc.

It is well known that enzymes are organic catalysts which trigger chemical reactions. "Appropriate" and "suitable" enzymes, as used herein, mean those enzymes which trigger specific types of chemical reactions, i.e. development of lactic acid in milk, development of curd and development of flavor, texture, bouquet, etc., of specific types of cheeses from milk curd. Each chemical reaction in the milk requires its own catalyst. The choice of enzyme preparation, therefore, depends upon the desired reaction. Despite the long evolution of the cheese-making industry relatively little is known about the chemical reactions which produce the characteristics of the various cheeses; even less is known about the catalysts which bring about these chemical reactions. Accordingly, the suitable enzymes used in our invention cannot be specifically defined by their chemical formula but rather by the results of their catalytic action, such as enzymes which induce the formation of curd in milk, enzymes which trigger the ripening or curing of curd, producing the characteristics of the desired cheese. Suitable enzymes are selective; those enzymes used to trigger the development of Bleu cheese will differ from those which induce the formation of Cheddar, Swiss, etc.

These enzymes may be obtained from any available source. For example, we have found that suitable enzymes can be obtained from microorganisms presently used in the cheese industry. $S.$ $lactis$ and $S.$ $cremoris$, for example, are commonly used as starters or curd producers. Enzyme extracts therefrom are suitable starter enzymes for use in our novel process.

Many of the microorganisms from which our suitable enzymes can be obtained are of known strains and can be obtained from commercial sources. Others are not known, known only in part or are not commercially available; in such instances we have found that cultures may be isolated from ripened cheeses and plated on agar, picked and transplanted. The growth of such cultures is accomplished by methods long known to those skilled in the art, i.e. submerged fermentation or moldy bran fermentation, etc. The nutrient media as well as the method of growth vary with the cultures.

Our enzyme preparations may be obtained from the various microorganisms by known methods. In general, the microorganisms are treated in order to change the cell permeability, i.e. by freeze drying, ultrasonics, etc. The broken cells may then be extracted or extracted and precipitated. The extraction is usually accomplished by a mildly alkaline solution, such as sodium tetraborate; the precipitation by acetone, alcohol or other suitable solvents.

The following examples illustrate some methods for obtaining suitable enzymes to be used in our novel cheese producing procedure:

*Example A*

*Penicillium roqueforti* is inoculated into moistened (water) whole wheat bread crumbs which are then incubated at 86° F. for four days. The bread is extracted with 1.7% sodium tetraborate overnight at 41° F. The extracts are centrifuged and precipitated with cold (5° F.) acetone. The precipitate is solubilized in water and freeze dried.

Example A illustrates a method for preparing a suitable enzyme to be used in the production of Roquefort cheese and other Bleu type cheeses by our novel procedure.

*Example B*

$S.$ $lactis$ and $S.$ $cremoris$ are mixed with cold (5° F.) acetone and centrifuged. The precipitate is treated with additional cold acetone and recentrifuged. The precipitate is solubilized in water and lyophilized.

Example B illustrates a method for preparing a suitable enzyme for the development of curd and unripened cheese by our novel procedure.

*Example C*

Whole wheat bread crumbs which have been inoculated with *P. camemberti* and incubated at 85° F. for 96 hours, are extracted with pH 7.4 phosphate buffer overnight at 41° F. The extracts are centrifuged with cold (5° F.) acetone. The precipitate is solubilized in water and freeze dried.

Example C represents a method for obtaining an appropriate enzyme for the production of Camembert cheese by our novel cheese producing procedure.

*Example D*

An isolant from a good quality of English Cheddar cheese is plated on agar, colonies are picked and transplants made. The culture is inoculated into tryptic digest of casein, glucose and soybean protein (TGE) and incubated for several days at 84° F. The cells are extracted with pH 7 phosphate buffer for 20 hours at 40° F. The extracts are centrifuged with cold acetone. The precipitate is solubilized in water and freeze dried.

Example D illustrates a method for preparing a suitable enzyme for use in the production of Cheddar cheese by our novel cheese producing procedure.

*Example E*

*P. roqueforti* is grown on Czapek-dox, milk medium for six days at 86° F. on a shaker. This is centrifuged with cold (5° F.) acetone in order to precipitate the enzymes. The precipitate is then solubilized in water and freeze dried.

Example F

*B. linens* and *Oidium lactis* are inoculated into milk moistened whole wheat bread crumbs and incubated for several days at 86° F. The bread is extracted with 1.7% sodium tetraborate overnight at 42° F. The extracts are centrifuged with cold acetone. The precipitate is solubilized in water and freeze dried.

Example F illustrates a method of obtaining a suitable enzyme for use in preparing Limburger cheese in accordance with our invention.

Example G

An acetone powder, suitable enzyme isolated from high quality Swiss cheese is prepared in accordance with the method set forth in Example D.

By the phrases, a suitable enzyme and an appropriate enzyme, we intend the enzyme or enzymes capable of catalyzing the chemical reactions which develop cheese from milk. More than one enzyme is precipitated and extracted and undoubtedly more than one enzyme catalyzes the chemical reactions in milk.

As is known to those skilled in the art, methods, other than those shown above, may be used for growing cultures and modifications of those methods illustrated may be made. The examples are merely illustrative of procedures that may be used.

Any of the ripened or unripened cheeses may be produced by our novel procedure of adding suitable enzymes to milk, said enzymes being capable of catalyzing the chemical reactions in the milk which develop the cheese characteristics. This direct addition of suitable enzymes directly to milk or milk curd enables one to distribute the catalyst uniformly throughout the curd and to control the amount of enzyme added. Our procedure produces a cheese in considerably less time than presently used methods, produces a more uniform cheese, eliminates involved, complicated and time-consuming procedures, enables one to re-produce the quality of the cheese and eliminates the rind and mold growth found on the ripened cheeses produced by present methods.

Our invention is particularly useful for the development of ripened cheese, which heretofore took months of effort and waiting.

Examples of ripened cheeses produced in accordance with our novel invention are as follows:

Example 1

125 mg. of the powdered suitable enzyme, as prepared in Example A, are added to 25 gms. of ewe's milk curd and mixed thoroughly therewith. The mixture is allowed to stand overnight at 41° F. The curd develops the aroma, bouquet and taste of Roquefort cheese.

Example 2

10 mg. of a suitable enzyme powder, prepared as in Example D above, is added to 50 gm. of curd and mixed uniformly therewith. The mixture is allowed to stand at 40° F. for three days. The Cheddar cheese characteristics are developed.

Example 3

25 mg. of a suitable enzyme, prepared as in Example C above, is mixed with 125 gm. of curd. After three days the characteristics of Camembert cheese are developed.

Curd may also be readily developed by our novel procedure as follows:

Example 4

10 mg. of suitable enzyme, prepared as in Example B above, is mixed uniformly with 50 cc. of milk. Within half an hour curd is formed in the milk.

The various chemical reactions are triggered enzymatically and minute amounts of enzyme addition are sufficient to catalyze the reaction, however the rate of reaction is increased as the concentration of the enzyme is increased. Therefore if it is desirable to reduce the time of curd formation, cheese ripening, etc., this may be accomplished by adding an additional quantity of enzyme.

Unripened cheeses are produced easily and quickly, for example

Example 5

0.5 gm. of a suitable enzyme, prepared as in Example B above, and 0.02 cc. of 0.07% solution of rennet are added to 100 cc. of skim milk and allowed to stand for 30 minutes at 78° F. The curd is separated from the whey; it is a palatable cottage cheese.

Example 6

The procedure of Example 5 is followed but the milk is a cream enriched milk. The cheese developed is cream cheese.

Some of the ripened cheeses are produced by adding suitable enzymes at the time that the curd producing enzymes are added. Swiss cheese is such a cheese. A method for producing Swiss cheese is as follows:

Example 7

50 mg. of an appropriate enzyme, prepared as in Example B above, together with 50 mg. of a suitable enzyme, prepared in accordance with Example G, are added to 100 cc. of partly skim milk. The mixture is allowed to stand overnight at 74° F. and high (about 95%) humidity and then allowed to stand several days at 41° F. A palatable Swiss cheese develops.

In those cheeses in which the suitable enzyme is added to curd, the curd may be produced by our procedure or by the usual commercial procedures.

Example 8

Curd is produced as in Example 4 above. 10 mg. of suitable enzyme, prepared as in Example F above, are mixed with 50 gm. of the curd. Within several days at about 60° F. and 80% humidity the characteristics of Limburger cheese are developed.

Example 9

50 mg. of suitable enzyme, prepared as in accordance with Example A, are added to and mixed thoroughly with 10 gm. of commercially prepared cottage cheese. Within 24 hours the flavor characteristics of Bleu cheese are developed in the cottage cheese.

One of the problems of the cheese industry today is the production of cheese flavored products, e.g. Bleu cheese flavored crackers. Actual Bleu cheese must be used in order to flavor the cracker. However, our invention enables one to produce a product having unique cheese flavor characteristics without employing actual cheese.

Example 10

50 mg. of suitable enzyme, prepared as in Example A, are added per 10 cc. of whole milk. Within 16 hours at 40° F. the milk has the flavor and aroma of Roquefort cheese.

Example 10 may be consumed as a unique cheese flavored milk or may be used as an ingredient of a cracker thereby producing a Bleu cheese flavored cracker without actually adding cheese.

Cheese flavored milk has heretofore not been possible because of the formation of curd and concomitant mold, both occurring in the present commercial cheese-producing procedures. As has been shown by Example 10, curd is not necessary for the developement of cheese flavor; mold is not produced by our direct addition of suitable enzymes to milk or to curd.

In the cheese-making art "process" cheese connotes cheeses containing additives, such as additional milk, whey, flavorings, emulsifiers, preservatives, coloring materials, etc. The cheese is generally of an inferior quality and is packaged as "process" cheese or cheese spread. While this "process" cheese satisfied certain cheese consumers, it holds little or no appeal for cheese fanciers.

Our invention, however, provides a method for improving the cheese characteristics of "process" cheese, as well as a method for combining various cheese characteristics.

*Example 11*

50 mg. of suitable enzyme, prepared as in Example A, are added to 50 gm. of a commercial, packaged "process" Bleu cheese spread. After standing for 12 hours at 41° F., the resulting Bleu cheese characteristics are vastly improved.

*Example 12*

To 50 gm. of a commercially packaged celery flavored cream cheese spread is added 50 mg. of a suitable enzyme, prepared as in Example A, and thoroughly mixed. After standing for 12 hours at 40° F., the cheese develops Bleu cheese flavor characteristics. This may be consumed as is or added to the remainder of the spread to give a Bleu flavored, celery flavored cream cheese spread.

Our invention may also be utilized to booster the presently used commercial procedures, reducing the curing time and improving the uniformity of the results thereof.

*Example 13*

Milk to which is added starter bacteria is warmed to 86° F. and "set" with 2.5% solution of rennet. After about 3 hours the curd is cut and the whey is drained off. The curd is then mixed with *P. roqueforti* and lightly salted. 50 mg. of suitable enzyme, prepared as in Example A above, is added per 100 gm. of treated curd. The curd is placed in perforated metal hoops and allowed to drain for 24 hours. The cheeses are "dry-salted" for about 24 hours at about 40° F. and 95% humidity. (Without the booster, this step would require about 10 days). The curing time is about 3 to 4 days (normally this would require 4 to 6 months).

Our invention is a novel method for producing all types of cheeses; it produces many products having unique cheese flavor characteristics. The examples illustrate the unique procedure and the unique products but are not intended to limit the invention to that which is shown.

What is claimed is:
1. A novel method for the production of cured cheese comprising contacting milk curd with enzymes extracted from the group consisting of *P. roqueforte* and *P. camemberti* and permitting the enzyme treated milk curd to stand for a sufficient period of time to form the cured cheese.
2. A novel method for the production of cheese having a Roqueforte cheese flavor comprising contacting milk curd with enzymes extracted from *Penicillium roqueforti* and permitting the enzyme treated milk curd to stand for a sufficient period of time to form the Roquefort cheese.
3. A novel method for the production of a food product having Roquefort cheese flavor comprising the steps of adding enzymes extracted from *Penicillium roqueforti* to milk allowing the milk to develop a Roquefort flavor and using said Roquefort flavored milk as the milk ingredient in a recipe for a food product.
4. A novel method for the production of cheese having Camembert cheese flavor comprising contacting milk curd with enzymes extracted from *Penicillium camemberti* and permitting the enzyme treated milk curd to stand for a sufficient period of time to form the Camembert cheese.
5. A novel method for the production of food product having Camembert cheese flavor comprising the steps of adding enzymes extracted from *Penicillium camemberti* to milk, allowing the milk to develop a Camembert flavor and using said Camembert flavored milk as the milk ingredient in a recipe for a food product.

References Cited by the Examiner

UNITED STATES PATENTS

| | | | |
|---|---|---|---|
| 770,030 | 9/1904 | Trillat | 99—116 |
| 1,391,219 | 9/1921 | Takamine et al. | 99—116 |
| 1,745,962 | 2/1930 | Thompson | 99—116 |
| 2,450,814 | 10/1948 | Roundy et al. | 99—116 |
| 2,531,329 | 11/1950 | Farnham | 99—116 |
| 2,560,182 | 7/1951 | Nelson et al. | 99—116 |

A. LOUIS MONACELL, *Primary Examiner.*

D. M. STEPHENS, *Assistant Examiner.*